United States Patent
Bao et al.

(10) Patent No.: US 11,222,222 B2
(45) Date of Patent: Jan. 11, 2022

(54) METHODS AND APPARATUSES FOR LIVENESS DETECTION, ELECTRONIC DEVICES, AND COMPUTER READABLE STORAGE MEDIA

(71) Applicant: BEIJING SENSETIME TECHNOLOGY DEVELOPMENT CO., LTD., Beijing (CN)

(72) Inventors: Tianpeng Bao, Beijing (CN); Liwei Wu, Beijing (CN); Rui Zhang, Beijing (CN); Kai Yang, Beijing (CN)

(73) Assignee: BEIJING SENSETIME TECHNOLOGY DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 16/649,748

(22) PCT Filed: Apr. 22, 2019

(86) PCT No.: PCT/CN2019/083639
§ 371 (c)(1),
(2) Date: May 28, 2020

(87) PCT Pub. No.: WO2020/048140
PCT Pub. Date: Mar. 12, 2020

(65) Prior Publication Data
US 2020/0410267 A1 Dec. 31, 2020

(51) Int. Cl.
*G06K 9/62* (2006.01)
*G06K 9/00* (2006.01)

(52) U.S. Cl.
CPC ..... *G06K 9/00906* (2013.01); *G06K 9/00268* (2013.01); *G06K 9/00288* (2013.01); *G06K 9/629* (2013.01); *G06K 9/6277* (2013.01)

(58) Field of Classification Search
CPC . G06K 9/00906; G06K 9/00221–2009/00328; G06K 9/629
See application file for complete search history.

(56) References Cited

U.S. PATENT DOCUMENTS

| 8,335,355 B2 | 12/2012 | Costache |
| 2010/0202707 A1 | 8/2010 | Costache |
| | (Continued) | |

FOREIGN PATENT DOCUMENTS

| CN | 104077597 A | 10/2014 |
| CN | 106127159 A | 11/2016 |
| | (Continued) | |

OTHER PUBLICATIONS

International Search Report in the international application No. PCT/CN2019/083639, dated Jul. 30, 2019, 2 pgs.
(Continued)

*Primary Examiner* — Brian Werner
(74) *Attorney, Agent, or Firm* — Cooper Legal Group, LLC

(57) ABSTRACT

The present disclosure relates to methods and apparatuses for liveness detection, electronic devices, and computer readable storage media, improving the accuracy of liveness detection. The method includes: carrying out feature extraction on a collected image to obtain image feature information; determining a modality classification result of the image based on the image feature information, the modality classification result indicating that the image corresponds to a target modality in at least one modality; and determining whether a target object in the image is living based on the modality classification result of the image.

18 Claims, 3 Drawing Sheets

(56) References Cited

U.S. PATENT DOCUMENTS

2017/0345146 A1   11/2017  Fan et al.
2019/0251380 A1*  8/2019  Park .................... G06K 9/6228

FOREIGN PATENT DOCUMENTS

| CN | 107451510 A | 12/2017 |
| CN | 108399401 A | 8/2018 |
| JP | 2008501196 A | 1/2008 |
| JP | 2009211178 A | 9/2009 |
| JP | 2014178862 A | 9/2014 |
| JP | 2018032391 A | 3/2018 |

OTHER PUBLICATIONS

First Office Action of the Japanese application No. 2020-517441, dated May 17, 2021, 9 pgs.

* cited by examiner

METHODS AND APPARATUSES FOR LIVENESS DETECTION, ELECTRONIC DEVICES, AND COMPUTER READABLE STORAGE MEDIA

CROSS-REFERENCE TO RELATED APPLICATION

The present application claims priority to Chinese Patent Application No. 201811046177.X, filed with the Chinese Patent Office on Sep. 7, 2018, and entitled "METHODS AND APPARATUSES FOR LIVENESS DETECTION, ELECTRONIC DEVICES, AND COMPUTER READABLE STORAGE MEDIA", which is incorporated herein by reference in its entirety.

TECHNICAL FIELD

The present disclosure relates to the field of computer vision, and in particular, to methods and apparatuses for liveness detection, electronic devices, and computer readable storage media.

BACKGROUND

With the rapid development and wide application of artificial intelligence technology, security issues increasingly attract the public attention. Face anti-spoofing is an essential part in application scenes where face recognition technologies are applied to various identity authentications. Face anti-spoofing, also referred to as liveness detection, is a technique for distinguishing whether a human face in front of a camera is from a real person or a fake person such as a paper photo, a screen picture, or a mask.

SUMMARY

Embodiments of the present disclosure provide technical solutions for liveness detection.

A method for liveness detection provided according to one aspect of the embodiments of the present disclosure includes: performing feature extraction on a collected image to obtain image feature information; determining a modality classification result of the image based on the image feature information, the modality classification result indicating that the image corresponds to a target modality in at least one modality; and determining whether a target object in the image is living based on the modality classification result of the image.

In some optional embodiments, where determining the modality classification result of the image based on the image feature information includes: performing classification processing based on the image feature information to obtain a classification probability that the image belongs to each of the at least one modality; and determining the target modality to which the image belongs based on the classification probability that the image belongs to each of the at least one modality.

In some optional embodiments, where determining whether the target object in the image is living based on the modality classification result of the image includes: determining whether the target object in the image is living based on the modality classification result of the image and the image feature information.

In some optional embodiments, the determining of whether the target object in the image is living based on the modality classification result of the image and the image feature information includes: merging the image feature information with the modality classification result of the image to obtain a merging result; and determining whether the target object in the image is living based on the merging result.

In some optional embodiments, the determining of whether the target object in the image is living based on the modality classification result of the image and the image feature information includes: obtaining an authenticity prediction probability corresponding to each of the at least one modality based on the image feature information; and determining whether the target object in the image is living based on the modality classification result and the authenticity prediction probability corresponding to each of the at least one modality.

In some optional embodiments, the modality classification result includes the classification probability that the image belongs to each of the at least one modality; and the determining whether the target object in the image is living based on the modality classification result and the authenticity prediction probability corresponding to each of the at least one modality includes: performing weighted sum on the authenticity prediction probabilities of all the at least one modality by taking the classification probability that the image belongs to each of the at least one modality as a weight value corresponding to the each of the at least one modality, so as to obtain a target authenticity prediction probability; and determining whether the target object in the image is living based on the target authenticity prediction probability.

In some optional embodiments, the determining of whether the target object in the image is living based on the modality classification result and the authenticity prediction probability corresponding to each of the at least one modality includes: determining a target authenticity prediction probability from the at least one authenticity prediction probability based on the classification probability corresponding to each of the at least one modality included in the modality classification result; and determining whether the target object in the image is living based on the target authenticity prediction probability.

In some optional embodiments, the determining of the target authenticity prediction probability from the at least one authenticity prediction probability based on the classification probability corresponding to each of the at least one modality included in the modality classification result includes: in response to presence of a classification probability greater than or equal to a predetermined probability in the at least one classification probability included in the modality classification result, determining the modality corresponding to the classification probability greater than or equal to the predetermined probability as the target modality, and determining the authenticity prediction probability of the target modality as the target authenticity prediction probability.

In some optional embodiments, before the performing feature extraction on a collected image to obtain image feature information, the method further includes: performing image acquisition on a target by means of a dual-channel camera to obtain the image.

In some optional embodiments, the at least one modality includes: a dual-channel modality and an RGB modality.

In some optional embodiments, the method is implemented by using a liveness detection network, and before the performing feature extraction on a collected image to obtain image feature information, the method further includes: training an initial liveness detection network based on a sample data set to obtain the liveness detection network, where the sample data set includes sample images of at least two modalities A method for liveness detection provided according to another aspect of the embodiments of the present disclosure includes: obtaining an image of a first modality; and performing liveness detection on the image by means of a liveness detection network to determine whether a target object in the image is living, where the liveness detection network is obtained by training an initial liveness detection network based on a sample image set, and the sample image set includes a sample image of the first modality and a sample image of a second modality.

In some optional embodiments, the performing liveness detection on the image by means of a liveness detection network to determine whether a target object in the image is living includes: performing feature extraction on the image by means of the liveness detection network to obtain image feature information; and determining whether the target object in the image is living by means of the liveness detection network based on the image feature information.

In some optional embodiments, the method further includes: performing feature extraction on a sample image in the sample image set to obtain sample feature information; determining a sample modality classification result of the sample image based on the sample feature information, the sample modality classification result indicating that the sample image corresponds to a sample modality in at least one modality; determining an authenticity prediction result of the sample image based on the sample modality classification result; and adjusting network parameters for training the initial liveness detection network based on the authenticity prediction result and tagged authenticity information of the sample image.

In some optional embodiments, where determining the sample modality classification result of the sample image based on the sample feature information includes: determining, based on the sample feature information, a classification probability that the sample image belongs to the first modality and a classification probability that the sample image belongs to the second modality; and determining a sample modality to which the sample image belongs based on the classification probability that the sample image belongs to the first modality and the classification probability that the sample image belongs to the second modality.

In some optional embodiments, where determining the authenticity prediction result of the sample image based on the sample modality classification result includes: determining the authenticity prediction result of the sample image based on the sample modality classification result and the sample feature information.

In some optional embodiments, where determining the authenticity prediction result of the sample image based on the sample modality classification result and the sample feature information includes: merging the sample feature information with the sample modality classification result of the sample image to obtain a sample merging result; and determining the authenticity prediction result of the sample image based on the sample merging result.

In some optional embodiments, the first modality is a near-infrared modality, and the second modality is an RGB modality.

An apparatus for liveness detection provided according to another aspect of the embodiments of the present disclosure includes: a feature extraction unit, configured to perform feature extraction on a collected image to obtain image feature information; a modality classification unit, configured to determine a modality classification result of the image based on the image feature information, where the modality classification result indicates that the image corresponds to a target modality in at least one modality; and a liveness detection unit, configured to determine whether a target object in the image is living based on the modality classification result of the image.

In some optional embodiments, the modality classification unit is configured to: perform classification processing based on the image feature information to obtain a classification probability that the image belongs to each of the at least one modality; and determine the target modality to which the image belongs based on the classification probability that the image belongs to each of the at least one modality.

In some optional embodiments, the liveness detection unit is configured to determine whether the target object in the image is living based on the modality classification result of the image and the image feature information.

In some optional embodiments, the liveness detection unit is configured to merge the image feature information with the modality classification result of the image to obtain a merging result, and determine whether the target object in the image is living based on the merging result.

In some optional embodiments, the liveness detection unit includes: an authenticity prediction probability module, configured to obtain an authenticity prediction probability corresponding to each of the at least one modality based on the image feature information; and a result determination module, configured to determine whether the target object in the image is living based on the modality classification result and the authenticity prediction probability corresponding to each of the at least one modality.

In some optional embodiments, the modality classification result includes the classification probability that the image belongs to each of the at least one modality; and the result determination module is configured to perform weighted sum on the authenticity prediction probabilities of all the at least one modality by taking the classification probability that the image belongs to each of the at least one modality as a weight value corresponding to the each of the at least one modality, so as to obtain a target authenticity prediction probability, and determine whether the target object in the image is living based on the target authenticity prediction probability.

In some optional embodiments, when the result determination module determines whether the target object in the image is living based on the modality classification result and the authenticity prediction probability corresponding to each of the at least one modality, the result determination module determines a target authenticity prediction probability from the at least one authenticity prediction probability based on the classification probability corresponding to each of the at least one modality included in the modality classification result; and the result determination module determines whether the target object in the image is living based on the target authenticity prediction probability.

In some optional embodiments, when the result determination module determines a target authenticity prediction probability from the at least one authenticity prediction probability based on the classification probability corresponding to each of the at least one modality included in the modality classification result, the result determination module includes: being configured in response to presence of a classification probability greater than or equal to a predetermined probability in the at least one classification probability included in the modality classification result; and the result determination module determines the modality corresponding to the classification probability greater than or equal to the predetermined probability as the target modality, and determines the authenticity prediction probability of the target modality as the target authenticity prediction probability.

In some optional embodiments, the apparatus further includes: an image acquisition unit, configured to perform image acquisition by means of a dual-channel camera to obtain the image.

In some optional embodiments, the at least one modality includes: a dual-channel modality and an RGB modality.

In some optional embodiments, the apparatus is implemented by using a liveness detection network; and the apparatus further includes: a network training unit, configured to train an initial liveness detection network based on a sample data set to obtain the liveness detection network, where the sample data set includes sample images of at least two modalities.

An apparatus for liveness detection provided according to another aspect of the embodiments of the present disclosure includes: an image acquisition unit, configured to obtain an image of a first modality; and a target detection unit, configured to perform liveness detection on the image by means of a liveness detection network to determine whether a target object in the image is living, where the liveness detection network is obtained by training an initial liveness detection network based on a sample image set, and the sample image set includes a sample image of the first modality and a sample image of a second modality.

In some optional embodiments, the target detection unit is configured to perform feature extraction on the image by means of the liveness detection network to obtain image feature information, and determine whether the target object in the image is living by means of the liveness detection network based on the image feature information.

In some optional embodiments, the apparatus further includes: a detection network training unit, configured to: perform feature extraction on a sample image in the sample image set to obtain sample feature information; determine a sample modality classification result of the sample image based on the sample feature information, the sample modality classification result indicating that the sample image corresponds to a sample modality in at least one modality; determine an authenticity prediction result of the sample image based on the sample modality classification result; and adjust network parameters of the initial liveness detection network based on the authenticity prediction result and tagged authenticity information of the sample image.

In some optional embodiments, the detection network training unit is configured to, when determining a sample modality classification result of the sample image based on the sample feature information, determine, based on the sample feature information, a classification probability that the sample image belongs to the first modality and a classification probability that the sample image belongs to the second modality, and determine a sample modality to which the sample image belongs based on the classification probability that the sample image belongs to the first modality and the classification probability that the sample image belongs to the second modality.

In some optional embodiments, the detection network training unit is configured to, when determining an authenticity prediction result of the sample image based on the sample modality classification result, determine the authenticity prediction result of the sample image based on the sample modality classification result and the sample feature information.

In some optional embodiments, the detection network training unit is configured to, when determining the authenticity prediction result of the sample image based on the sample modality classification result and the sample feature information, merge the sample feature information with the sample modality classification result of the sample image to obtain a sample merging result, and determine the authenticity prediction result of the sample image based on the sample merging result.

In some optional embodiments, the first modality is a near-infrared modality, and the second modality is an RGB modality.

An electronic device provided according to another aspect of the embodiments of the present disclosure includes a processor, where the processor includes the apparatus for liveness detection according to any one of the foregoing embodiments.

An electronic device provided according to another aspect of the embodiments of the present disclosure includes: a memory, configured to store executable instructions; and a processor, configured to communicate with the memory to execute the executable instructions so as to perform operations of the method for liveness detection according to any one of the foregoing embodiments.

A computer readable storage medium provided according to another aspect of the embodiments of the present disclosure is configured to store computer readable instructions, where when the instructions are executed, the operations of the method for liveness detection according to any one of the foregoing embodiments are executed.

A computer program product provided according to another aspect of the embodiments of the present disclosure includes computer readable codes, where when the computer readable codes run in a device, the processor in the device executes the instructions for implementing the method for liveness detection according to any one of the foregoing embodiments.

Another computer program product provided according to yet another aspect of the embodiments of the present disclosure is configured to store computer readable instructions, where when the instructions are executed, a computer executes operations of the method for liveness detection in any one of the foregoing possible implementations.

In one optional implementation, the computer program product is specifically a computer storage medium. In another optional implementation, the computer program product is specifically a software product, such as SDK.

According to the embodiments of the present disclosure, further provided are another method for liveness detection and apparatus, another electronic device, another computer storage medium, and another computer program product, including: performing feature extraction on a collected image to obtain image feature information; determining a modality classification result of the image based on the image feature information, the modality classification result indicating that the image corresponds to a target modality in at least one modality; and determining whether a target object in the image is living based on the modality classification result of the image.

Based on the methods and apparatuses for liveness detection, electronic devices, and computer readable storage media provided according to the foregoing embodiments of the present disclosure, feature extraction is carried out on a collected image to obtain image feature information; a modality classification result of the image is determined based on the image feature information, the modality classification result indicating that the image corresponds to a target modality in at least one modality; whether a target object in the image is living is determined based on the modality classification result of the image; and by predicting the modality of the image and determining whether the target object is living according to the modality classification result, the compatibility of liveness detection with different modalities is improved, and the detection result is more accurate.

The following further describes in detail the technical solutions of the present disclosure with reference to the accompanying drawings and embodiments.

BRIEF DESCRIPTION OF THE ACCOMPANYING DRAWINGS

The accompanying drawings constituting a part of the specification describe the embodiments of the present disclosure and are intended to explain the principles of the present disclosure together with the descriptions. According to the following detailed descriptions, the present disclosure may be understood more clearly with reference to the accompanying drawings.

DETAILED DESCRIPTION

Figure 1:
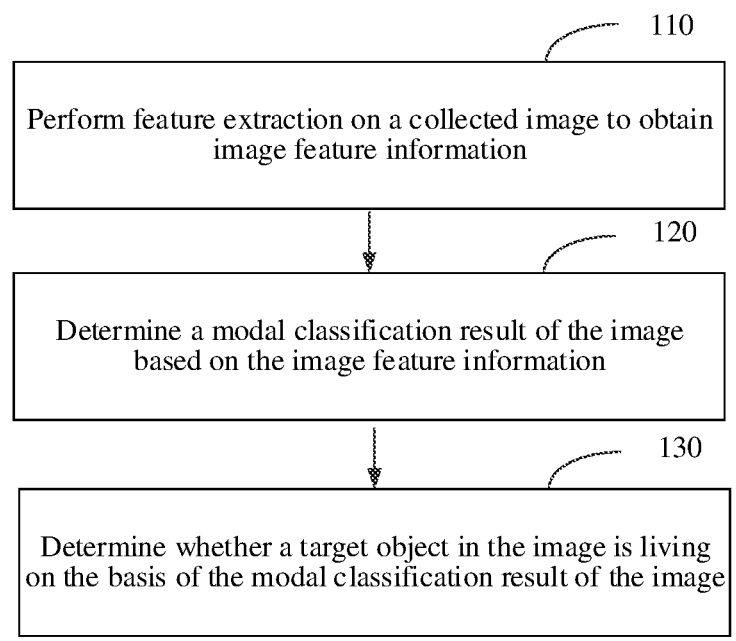
FIG. 1 is a flowchart of a method for liveness detection provided according to embodiments of the present disclosure.

Various exemplary embodiments of the present disclosure are now described in detail with reference to the accompanying drawings. It should be noted that, unless otherwise stated specifically, relative arrangement of the components and operations, the numerical expressions, and the values set forth in the embodiments are not intended to limit the scope of the present disclosure. In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof. Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

In the related art, from the point of view of a sensor, a camera mainly includes a monocular camera and a binocular camera.

The monocular camera includes, but is not limited to, an RGB camera, a near-infrared camera and a dual-channel camera, where the dual-channel camera may simultaneously allow light in visible spectrum and near-infrared spectrum to pass through for superimposed imaging. All non-RGB cameras including the near-infrared camera and the dual-channel camera are collectively referred to as a novel monocular camera below. Both the near-infrared camera and the dual-channel camera are provided with an active light source, and clear images are obtained through active lighting under dark light, which solve the problem that a common RGB camera is poor in imaging under dark light. However, there are also important differences between the above two cameras: the near-infrared camera needs to emit active light when being used every time, and the dual-channel camera may control whether to turn on the active light source according to requirements. A dual-channel image obtained under the turn-off of the active light source has no obvious difference from the RGB image, and generally, in consideration of saving power consumption, the active light source of the dual-channel camera is turned on only under a dark light condition (for example, the external light intensity is lower than a light intensity threshold).

Because of differences in hardware imaging principles, the near-infrared image or the dual-channel image obtained under the turn-on of the active light source is greatly different from the RGB image. In the present disclosure, images obtained by different imaging principles are referred to as images with different "modalities".

The embodiments of the present disclosure may be applied to an image collected by the dual-channel camera, where the image obtained by the dual-channel camera corresponds to two modalities, namely, a dual-channel modality and an RGB modality, where the collected image belongs to the dual-channel modality when the active light source of the dual-channel camera is turned on, and the collected image belongs to the RGB modality when the active light source is turned off. Alternatively, the embodiments of the present disclosure may also be applied to images collected by other types of novel monocular cameras. No limitation is made thereto in the embodiments of the present disclosure.

FIG. 1 is a flowchart of a method for liveness detection provided according to embodiments of the present disclosure.

At operation 110, feature extraction is carried out on a collected image to obtain image feature information.

In some optional embodiments, image acquisition may be carried out by means of a dual-channel camera or other types of novel monocular cameras, and an image is obtained, where the image includes a target object, and whether the target object is living is detected, for example, whether the target object is a real face is detected so as to prevent the occurrence of a fake face.

Optionally, feature extraction of an image may be realized through a deep neural network or other types of machine learning algorithms. The embodiments of the present disclosure do not limit the specific implementations for the feature extraction.

The image feature information obtained by feature extraction may be a feature image, a feature tensor, a feature matrix corresponding to each of at least one channel or the like. No limitation is made thereto in the embodiments of the present disclosure.

At operation 120, a modality classification result of the image is determined based on the image feature information.

The modality classification result indicates that the image corresponds to a target modality in at least one modality. In some optional embodiments, the at least one modality may be preset multiple modalities, and the modality classification result indicates that the image belongs to which modality in the multiple modalities.

At operation 120, the modality classification result of the image may be determined in various ways. In some optional embodiments, classification processing is carried out based on the image feature information to obtain a classification probability that the image belongs to each of the at least one modality, and the target modality to which the image belongs is determined based on the classification probability of each of the at least one modality.

Specifically, the classification probability of each modality may be obtained based on the image feature information, where the classification probability of a modality indicates the probability that the image belongs to the modality. For example, the at least one modality may refer to two modalities, namely, a first modality and a second modality, and two classification probabilities are obtained based on the image feature information, where the classification probability of the first modality is 0.9, and the classification probability of the second modality is 0.5. In this case, the modality to which the image belongs may be determined based on the classification probability of the first modality and the classification probability of the second modality. In one example, a threshold is preset, and the modality corresponding to the classification probability reaching the threshold is determined as the modality to which the image belongs, for example, the threshold is set as 0.8. In this case, the classification probability of the first modality, i.e., 0.9, is greater than the threshold, and the classification probability of the second modality is less than the threshold. Therefore, the first modality may be taken as the modality to which the image belongs, i.e., the target modality. In another example, the modality corresponding to a maximum value in the two classification probabilities may be determined as the modality to which the image belongs. The embodiments of the present disclosure do not limit specific implementations for determining the target modality based on each of the at least one classification probability.

In some other optional embodiments, the two classification probabilities may be directly taken as the modality classification result, namely, the modality classification result includes the classification probability corresponding to each of the at least one modality. In this case, optionally, a liveness detection result of the target object in the image may be determined based on the classification probability corresponding to each modality in the modality classification result. For example, the classification probability corresponding to each modality is taken as a weight of the each modality to obtain the liveness detection result. However, no limitation is made thereto in the embodiments of the present disclosure.

Optionally, in the embodiments of the present disclosure, the classification of the image may be performed through a modality classifier based on the image feature information so as to obtain an accurate modality classification result, a modality classifier may be a classification network, and the classification network may take the image feature information as an input, and output the classification probability of each of the at least one modality or the modality classification result of the image. No limitation is made thereto in the embodiments of the present disclosure.

At operation 130, whether a target object in the image is living is determined based on the modality classification result of the image.

In the embodiments of the present disclosure, the liveness detection result of the image is determined based on the modality to which the image belongs, so that the images of different modalities may be detected more pertinently, and the accuracy of the liveness detection is improved.

Based on the method for liveness detection provided according to the foregoing embodiments of the present disclosure, feature extraction is carried out on the collected image to obtain image feature information; a modality classification result of the image is determined based on the image feature information, the modality classification result indicating that the image corresponds to a target modality in at least one modality; whether a target object in the image is living is determined based on the modality classification result of the image; and by predicting the modality of the image and determining whether the target object is living according to the modality classification result, the compatibility of liveness detection with different modalities is improved, and the detection result is more accurate.

In some optional embodiments, the operation 130 includes:

determining whether the target object in the image is living based on the modality classification result of the image and the image feature information.

In this case, whether the target object is living is determined based on not only the modality classification result, but also the image feature information. The modality classification result is a result obtained based on the image feature information that the current image belongs to which modality, and the image feature information represents features of the image. The liveness detection result obtained based on the image feature information and the modality classification result is more accurate.

Optionally, the determining of whether the target object in the image is living based on the modality classification result of the image and the image feature information includes: merging the image feature information with the modality classification result of the image to obtain a merging result; and determining whether the target object in the image is living based on the merging result.

Optionally, the merging may be fusing or concatenating of the modality classification result and the image feature information, for example, the modality classification result and the image feature information are superimposed along dimension, or the image feature information and the modality classification result may be added in an element-by-element manner, or are merged in other manners. No limitation is made thereto in the embodiments of the present disclosure.

Optionally, the merging result may be input into an authenticity classifier, where the authenticity classifier optionally obtains a classification probability vector based on the merging result, and the classification probability vector includes two values, one of which indicates the probability that the target is non-living, and the other indicates the probability that the target is living. The liveness detection result is determined according to the two values. In one example, the liveness detection result is determined by comparing the two values, for example, if the probability of non-living is greater than the probability of living, it is determined that the target object is real, and if the probability of living is greater than the probability of non-living, it is determined that the target object is fake. In another example, whether the target object is living is determined by comparing the probabilities and a preset threshold, for example, if the probability of non-living is greater than the preset threshold, the target object is determined to be real. No limitation is made thereto in the embodiments of the present disclosure.

In some optional embodiments, the modality classification result includes identification information of the target modality, and correspondingly, the determining of whether the target object in the image is living based on the modality classification result of the image and the image feature information includes:

processing the image feature information based on the target modality to obtain an authenticity prediction probability corresponding to the target modality; and determining whether a target object in the image is living based on the authenticity prediction probability corresponding to the target modality.

In this case, different processing may be performed on the image feature information based on different target modalities. For example, the image feature information of different modalities is processed by using different authenticity classifiers, where the different authenticity classifiers correspond to different network parameters, or the image feature information of different modalities is processed by using different authenticity classification algorithms or different algorithm parameters to obtain the authenticity classification probability. However, no limitation is made thereto in the embodiments of the present disclosure.

In some other optional embodiments, the determining of whether the target object in the image is living based on the modality classification result of the image and the image feature information includes:

obtaining an authenticity prediction probability corresponding to each of the at least one modality based on the image feature information; and determining whether the target object in the image is living based on the modality classification result and the authenticity prediction probability corresponding to each of the at least one modality.

In the embodiments of the present disclosure, the authenticity prediction probability corresponding to each modality is obtained respectively, and whether the target object in the image is living is determined based on the authenticity prediction probabilities corresponding to different modalities as well as the modality classification result, so as to improve the accuracy of the liveness detection.

Optionally, the image feature information may be processed through an authenticity classifier to obtain an authenticity prediction probability. In some optional embodiments, the authenticity classifier includes at least one sub-classifier for processing different modalities respectively. Optionally, classification processing is carried out on the image feature information by means of the at least one sub-classifier in the authenticity classifier to obtain at least one authenticity prediction probability, and whether the target object is living is then determined based on the modality classification result obtained by the modality classifier and the at least one authenticity prediction probability obtained by the authenticity classifier.

In some other optional embodiments, the modality classification result includes the classification probability that the image belongs to each of the at least one modality.

Correspondingly, the determining of whether the target object in the image is living based on the modality classification result and the authenticity prediction probability corresponding to each of the at least one modality includes:

carrying out weighted sum on the authenticity prediction probabilities of all the at least one modality by taking the classification probability of each of the at least one modality as a weight value corresponding to the each modality, so as to obtain a target authenticity prediction probability; and determining whether the target object in the image is living based on the target authenticity prediction probability.

In the embodiments of the present disclosure, the authenticity prediction probability corresponding to each modality is subjected to soft weighting (i.e., weighted sum) by using the classification probability corresponding to the each modality as a weight value, and the result of the soft weighing is taken as a probability vector of whether the target object is living. Optionally, the result of the soft weighting may be further normalized, so that the sum of the two values in the output probability vector is 1. However, the embodiments of the present disclosure are not limited thereto.

In some other optional embodiments, the determining of whether the target object in the image is living based on the modality classification result and the authenticity prediction probability corresponding to each of the at least one modality includes:

determining a target authenticity prediction probability from the at least one authenticity prediction probability based on the classification probability corresponding to each of the at least one modality included in the modality classification result; and determining whether the target object in the image is living based on the target authenticity prediction probability.

Optionally, the target modality is determined from the at least one modality based on the at least one classification probability included in the modality classification result, and the authenticity prediction probability of the target modality is determined as the target authenticity prediction probability. For example, in response to presence of a classification probability in at least one classification probability that is greater than or equal to a predetermined probability, the modality corresponding to the classification probability greater than or equal to the predetermined probability is determined as the target modality. However, the embodiments of the present disclosure are not limited thereto.

In order to determine the modality corresponding to the image, the at least one classification probability is compared with the predetermined probability separately, and the modality corresponding to the classification probability greater than or equal to the predetermined probability is determined as the target modality. The at least one classification probability may also be sorted according to the value, and the maximum classification probability is determined as the target modality. The embodiments of the present disclosure do not limit specific implementations for determining the target modality.

In the embodiments of the present disclosure, one authenticity prediction probability from the authenticity prediction probabilities corresponding to at least one modality is determined, based on the classification probability of the at least one modality, as a target authenticity prediction probability corresponding to the image, where one modality is determined from the classification probability of the at least one modality as the modality of the image, and the authenticity prediction probability corresponding to the image may be obtained based on the modality. This manner may be used for processing an image obtained by the monocular camera with only one modality, and may also be used for processing the image obtained by the monocular camera including multiple modalities, which serves as a special form of soft weighting.

In some optional embodiments, the method in the embodiments of the present disclosure is implemented by using a liveness detection network. Optionally, liveness detection is carried out on the collected image by using the liveness detection network to obtain a liveness detection result of the image. For example, the collected image is directly input into the liveness detection network for liveness detection, or the collected image is preprocessed and then input into the liveness detection network for liveness detection. No limitation is made thereto in the embodiments of the present disclosure.

Before operation 110, the method further includes: training an initial liveness detection network based on a sample data set to obtain the liveness detection network, where the sample data set includes sample images of at least two modalities, the sample image has tagged authenticity information, and the tagged authenticity information indicates whether a target object in the sample image is living.

In order to realize better liveness detection, the liveness detection network needs to be trained. Because different modalities need to be classified, the sample data set includes sample images of at least two modalities, so as to train the modality classifier in the network.

Optionally, the liveness detection network includes a deep neural network, a modality classifier, and an authenticity classifier.

The operation of training an initial liveness detection network based on a sample data set to obtain the liveness detection network includes:

carrying out feature extraction on each sample image in the sample data set based on the deep neural network to obtain at least two pieces of sample feature information;

processing the at least two pieces of sample feature information respectively based on the modality classifier to obtain at least two sample modality classification results;

obtaining an authenticity prediction result of each sample image in the sample data set respectively by using the authenticity classifier based on the at least two sample modality classification results and the at least two pieces of sample feature information; and training the initial liveness detection network based on the prediction authenticity result and the tagged authenticity information to obtain the liveness detection network.

In the embodiments of the present disclosure, feature extraction is carried out on all sample images through the parameter-sharing deep neural network, different modality classification results are obtained through the modality classifier based on the feature, and an authenticity result of the sample image is predicted through the authenticity classifier, so that training of the deep neural network, the modality classifier, and the authenticity classifier is implemented.

Figure 2:
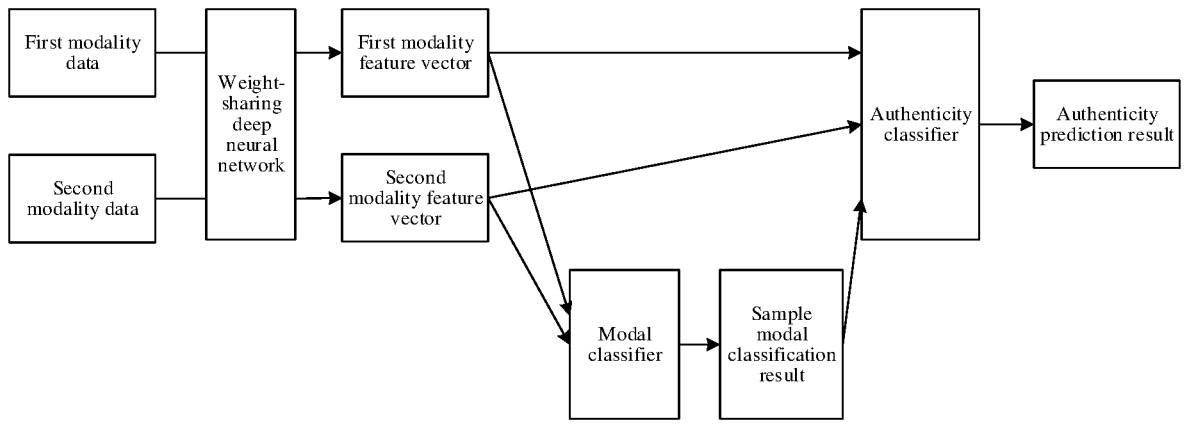
FIG. 2 is a schematic flowchart of a training process of a liveness detection network provided according to the embodiments of the present disclosure.

FIG. 2 is a schematic flowchart of a training process of a liveness detection network provided according to the embodiments of the present disclosure. As shown in FIG. 2, the liveness detection network includes a deep neural network, a modality classifier, and an authenticity classifier. Assuming that first modality data is an image of a dual-channel modality obtained by the dual-channel camera, and second modality data is an image of an RGB modality obtained by the dual-channel camera. After the first modality data and the second modality data are subjected to a trained weight-sharing deep neural network, respective feature vectors may be obtained. The two types of feature vectors include similar living clue information, and also imply specific information of respective modalities. For example, the image of the dual-channel modality is obviously redder. By using the feature vectors of the first modality data and the second modality data, a sample modality classification result is obtained through the modality classifier, and the sample modality classification result and the feature vectors are then input into the authenticity classifier. An authenticity prediction result is obtained through the authenticity classifier (i.e., determining whether the sample image includes a living feature). A loss may be determined based on the authenticity prediction result and the tagged authenticity information, and the authenticity classifier, the modality classifier and the weight-sharing deep neural network are trained based on the determined loss.

Figure 3:
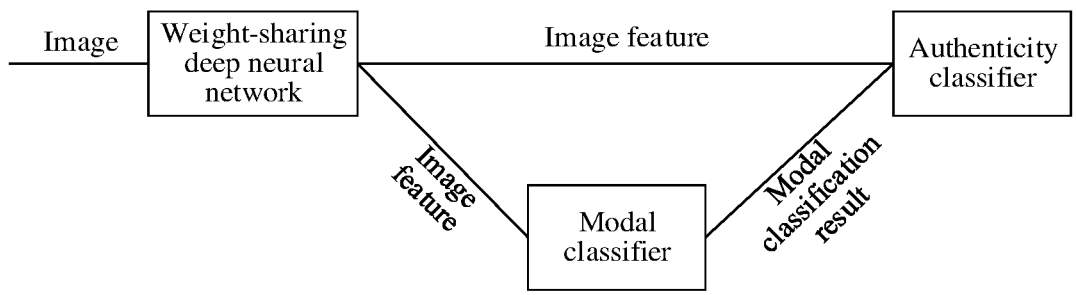
FIG. 3 is a schematic structural diagram of a liveness detection network provided according to the embodiments of the present disclosure.

FIG. 3 is a schematic structural diagram of a liveness detection network provided according to the embodiments of the present disclosure. As shown in FIG. 3, in the embodiments of the present disclosure, in the application process of the trained liveness detection network, the liveness detection network includes the weight-sharing deep neural network, the modality classifier, and the authenticity classifier. An image is input into the weight-sharing deep neural network to obtain image feature information corresponding to the image, and the image feature information is input into the modality classifier to obtain a modality classification result. A determination result about whether the target object is living may be obtained based on the processing of the modality classification result and the image feature information by the authenticity classifier.

images of two modalities are obtained when an external light source of the dual-channel camera is turned on and turned off, and both the two modalities may occur during use of the algorithm.

A multi-modality face anti-spoofing method may be realized based on the method for liveness detection provided according to the foregoing embodiments, and during the usage of the method, an output of the modality classifier may be merged to obtain higher precision. In other words, an input of the authenticity classifier of the multi-modality face anti-spoofing method includes one of multiple authenticity prediction probabilities (which may be represented in the form of a vector) and the corresponding modality classification result thereof, and output data of the authenticity classifier is the probability of including a living feature. Whether a collected face is living may be determined based on the probability of including a living feature. The specific implementations include, but are not limited to:

1. merging the authenticity prediction probability corresponding to modality data and the predicted modality classification result into a new feature vector;

2. carrying out probability prediction on the authenticity prediction probability corresponding to the modality data for various possible modalities respectively, and carrying out soft weighting on the probabilities by using the predicted modality classification result; and 3. carrying out probability prediction on the authenticity prediction probability corresponding to the modality data for various possible modalities respectively, and carrying out hard weighting on the probabilities by using the predicted modality classification result (i.e., directly selecting the probability corresponding to a predicted modality number as a final determination for determining whether the modality data includes living information).

The embodiments of the present disclosure provide a modality classifier aiming at the particularity of a large imaging difference of a dual-channel monocular camera when an external light source is turned on and turned off, which is used for solving the problem that a unified threshold cannot be used due to the fact that two types of different modality data have a great difference during the use of the algorithm. The present disclosure gives implementations of multiple authenticity classifiers, and fully utilizes output information of the modality classifiers. The authenticity classifier in the related art merely takes the feature as an input without considering modality-related information.

By using the weight-sharing deep neural network, data of different modalities may be fully used, and an algorithm with stronger generalization ability is obtained.

By using the modality classifier, the modality of the data may be predicted and used as an additional input of the authenticity classifier, thus solving the compatibility problem of the authenticity classifier for two types of modality data.

In specific application, the multi-modality method in the present disclosure may be applied to a face unlocking product of a mobile phone containing a dual-channel monocular camera. The multi-modality face anti-spoofing method in the present disclosure may be applied to a customized device including a dual-channel camera or other multi-modality monocular cameras, and be used for face anti-spoofing. The modality classifier in the present disclosure may also be used to predict whether an external light source is turned on, and by providing such information may be to the external, and an extra help may be provided to hardware with bad synchronization of a photographing function and an external light source.

A person of ordinary skill in the art may understand that: all or some operations for implementing the foregoing method embodiments are achieved by related hardware instructed by a program; the foregoing program may be stored in a computer readable storage medium; and when the program is executed, the operations including the foregoing method embodiments are executed. Moreover, the foregoing storage medium includes various media capable of storing program codes, such as a ROM, a RAM, a magnetic disk, or an optical disk.

Figure 4:
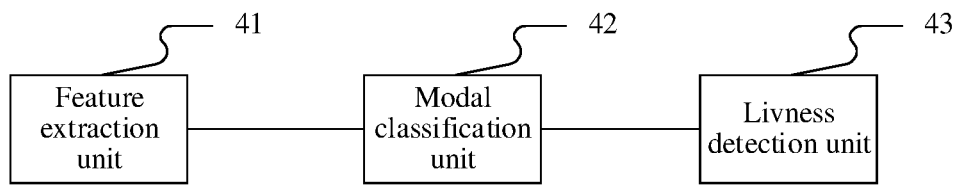
FIG. 4 is a schematic structural diagram of an apparatus for liveness detection according to the embodiments of the present disclosure.

FIG. 4 is a schematic structural diagram of an apparatus for liveness detection according to the embodiments of the present disclosure. In some embodiments, the apparatus is configured to implement the foregoing method embodiments of the present disclosure. As shown in FIG. 4, the apparatus includes:

a feature extraction unit 41, configured to carry out feature extraction on a collected image to obtain image feature information.

In some optional embodiments, image acquisition may be carried out by means of a dual-channel camera or other types of novel monocular cameras to obtain an image, where the image includes a target object, and whether the target object is living may be detected, for example, whether the target object is a real face is detected so as to prevent the occurrence of a fake face.

A modality classification unit 42 is configured to determine a modality classification result of the image based on the image feature information.

The modality classification result indicates that the image corresponds to a target modality in at least one modality. In some optional embodiments, the at least one modality may be preset multiple modalities, and the modality classification result indicates that the image belongs to which modality in the multiple modalities.

A liveness detection unit 43 is configured to determine whether a target object in the image is living based on the modality classification result of the image.

Based on the apparatus for liveness detection provided according to the foregoing embodiments of the present disclosure, feature extraction is carried out on a collected image to obtain image feature information; a modality classification result of the image is determined based on the image feature information, the modality classification result indicating that the image corresponds to a target modality in at least one modality; whether a target object in the image is living is determined based on the modality classification result of the image; and by predicting the modality of the image and determining whether the target object is living according to the modality classification result, the compatibility of liveness detection with different modalities is improved, and the detection result is more accurate.

In some optional embodiments, the modality classification unit 42 is configured to: carry out classification processing based on the image feature information to obtain a classification probability that the image belongs to each of the at least one modality; and determine the target modality to which the image belongs based on the classification probability of each of the at least one modality.

In some optional embodiments, the classification probability of each modality may be obtained based on the image feature information, where the classification probability of the modality indicates the probability that the image belongs to the modality. For example, the at least one modality may refer to two modalities, namely, a first modality and a second modality, and two classification probabilities are obtained based on the image feature information, where the classification probability of the first modality is 0.9, and the classification probability of the second modality is 0.5. In this case, the modality to which the image belongs may be determined based on the classification probability of the first modality and the classification probability of the second modality. In one example, a threshold is preset, and the modality corresponding to the classification probability reaching the threshold is determined as the modality to which the image belongs, for example, the threshold is set as 0.8. In this case, the classification probability of the first modality, i.e., 0.9, is greater than the threshold, and the classification probability of the second modality is less than the threshold. Therefore, the first modality is taken as the modality to which the image belongs, i.e., the target modality. In another example, the modality corresponding to the maximum value in the two classification probabilities may be determined as the modality to which the image belongs. The embodiments of the present disclosure do not limit specific implementations for determining the target modality based on each of the at least one classification probability.

In some other optional embodiments, the two classification probabilities may be directly taken as the modality classification result, namely, the modality classification result includes the classification probability corresponding to each of the at least one modality. In this case, optionally, a liveness detection result of the target object in the image may be determined based on the classification probability corresponding to each modality in the modality classification result. For example, the classification probability corresponding to each modality is taken as a weight of the each modality to obtain the liveness detection result. However, no limitation is made thereto in the embodiments of the present disclosure.

In some optional embodiments, a liveness detection unit 43 is configured to determine whether the target object in the image is living based on the modality classification result of the image and the image feature information.

In this case, whether a target object is living is determined based on the modality classification result and the image feature information. The modality classification result is a result obtained based on the image feature information that a current image belongs to which modality, and the image feature information represents a feature of the image. The liveness detection result obtained based on the image feature information and the modality classification result is more accurate.

Optionally, in some optional embodiments, the liveness detection unit 43 is configured to merge the image feature information with the modality classification result of the image to obtain a merging result, and determine whether the target object in the image is living based on the merging result.

Optionally, in some other optional embodiments, the liveness detection unit 43 includes:

an authenticity prediction probability module, configured to obtain an authenticity prediction probability corresponding to each of the at least one modality based on the image feature information; and a result determination module, configured to determine whether the target object in the image is living based on the modality classification result and the authenticity prediction probability corresponding to each of the at least one modality.

Optionally, the modality classification result includes the classification probability that the image belongs to each of the at least one modality.

The result determination module is configured to carry out weighted sum on the authenticity prediction probabilities of all the at least one modality by taking the classification probability of each of the at least one modality as a weight value corresponding to the each modality, so as to obtain a target authenticity prediction probability, and determine whether the target object in the image is living based on the target authenticity prediction probability.

Optionally, the result determination module is configured to, when determining whether the target object in the image is living based on the modality classification result and the authenticity prediction probability corresponding to each of the at least one modality, determine a target authenticity prediction probability from the at least one authenticity prediction probability based on the classification probability corresponding to each of the at least one modality included in the modality classification result; and the result determination module determines whether the target object in the image is living based on the target authenticity prediction probability.

Optionally, the result determination module is configured to determine a target authenticity prediction probability from the at least one authenticity prediction probability based on the classification probability corresponding to each of the at least one modality included in the modality classification result, including: in response to presence of a classification probability greater than or equal to a predetermined probability in the at least one classification probability included in the modality classification result, determining the modality corresponding to the classification probability greater than or equal to the predetermined probability as a target modality, and determining the authenticity prediction probability of the target modality as the target authenticity prediction probability.

Optionally, the apparatus according to the embodiments of the present disclosure further includes:

an image acquisition unit, configured to carry out image acquisition by means of a dual-channel camera to obtain the image.

Optionally, the at least one modality includes: a dual-channel modality and an RGB modality.

In some optional embodiments, the apparatus in the embodiments of the present disclosure is implemented by using a liveness detection network.

The apparatus in the embodiments of the present disclosure further includes: a network training unit, configured to train an initial liveness detection network based on a sample data set to obtain the liveness detection network, where the sample data set includes sample images of at least two modalities, the sample image has tagged authenticity information, and the tagged authenticity information indicates whether a target object in the sample image is living.

In order to realize better liveness detection, the liveness detection network needs to be trained. Because different modalities need to be classified, the sample data set includes sample images of at least two modalities so as to train the modality classifier in the network.

Figure 5:
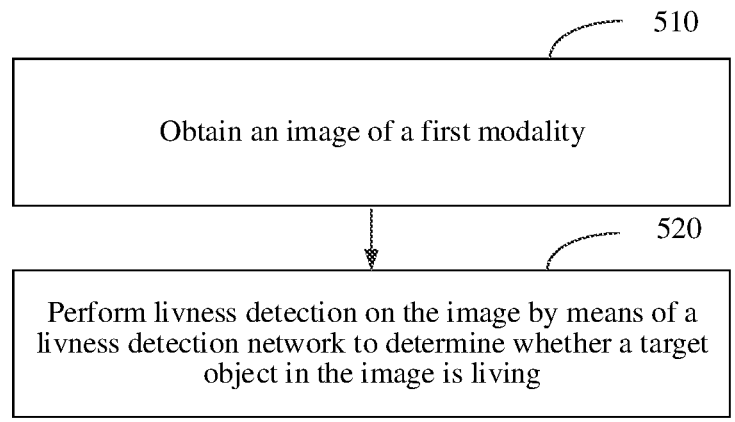
FIG. 5 is a schematic flowchart of one example of the method for liveness detection according to the present disclosure.

FIG. 5 is a schematic flowchart of one example of a method for liveness detection according to the present disclosure.

At operation 510, an image of a first modality is obtained.

Optionally, an image of a target object is collected by a near-infrared camera and other types of novel monocular cameras (i.e., non-RGB cameras). In this case, although the problem of poor imaging quality of a conventional RGB camera under dark light is solved, an image collected by a novel monocular camera such as a near-infrared camera is more difficult to obtain than the image collected by an RGB camera. Image data (such as near-infrared data) collected by the novel monocular camera is very few on the Internet, and the quantity and diversity of the data collected by the novel monocular camera are far less than those of RGB data. At present, the practical living technology is implemented based on deep learning, and the quantity and diversity of the data have important influence on the generalization ability of the algorithm. Therefore, in the embodiments of the present disclosure, in the training process of a neural network for liveness detection, the neural network is subjected to cross-modality training based on the RGB data, and the problem of poor modality performance due to insufficient training data is solved.

At operation 520, liveness detection is carried out on the image by means of a liveness detection network to determine whether a target object in the image is living.

The liveness detection network is obtained by training an initial liveness detection network based on a sample image set, and the sample image set includes a sample image of the first modality and a sample image of a second modality.

In the embodiments of the present disclosure, the liveness detection network is configured to detect whether a target object included in the image of the first modality is living, and a training sample set of the liveness detection network includes a sample image of the first modality and the sample image of a second modality different from the first modality, where, optionally, the number of sample images of the second modality may be equal to or greater than the number of the sample images of the first modality, and liveness detection of the image of the first modality is implemented by a cross-modality trained neural network.

In the embodiments of the present disclosure, liveness detection of the image of the first modality may be realized by the liveness detection network in various ways. In some optional embodiments, the liveness detection network carries out feature extraction on the image to obtain image feature information, and determines whether the a target object in the image is living based on the image feature information.

In some optional embodiments, the image collected by a novel monocular camera belongs to a first modality (a near-infrared modality). For example, the image collected by a near-infrared camera belongs to the first modality, and a second modality is an RGB modality, namely, the image collected by an RGB camera belongs to the second modality. In the training process, the image collected by an infrared camera serves as first modality data, and RGB data serves as second modality data. Although the first modality data and the second modality data have a large visual difference, clues of some fake persons included therein have similarity. For example, the paper photo exposes an obvious edge in the image, and the screen photo has a highlight in a local area due to light reflection. Similar clues among different modalities may be learned through a parameter-sharing deep learning network and learning tasks of different modality data. Here, the first modality data provides special fake clues in the first modality, and the second modality data provides various general fake clues. The combined action of different modality data may enable a final deep learning network to learn special fake information of the first modality, and see various general fake clues, so that the phenomenon that the generalization ability of an algorithm is weakened due to overfitting is avoided.

In the embodiments of the present disclosure, the liveness detection network is trained by combining the image of the second modality, so that the phenomenon of overfitting in the training process caused by small quantity of images of the first modality is avoided, and the trained liveness detection network may more accurately determine whether a target object in the image of the first modality is living.

In some optional embodiments, the operations of raining an initial liveness detection network based on a sample data set include:

carrying out feature extraction on a sample image to obtain sample feature information; determining a sample modality classification result of the sample image based on the sample feature information, the sample modality classification result indicating that the sample image corresponds to a sample modality in at least one modality; determining an authenticity prediction result of the sample image based on the sample modality classification result; and adjusting network parameters of the initial liveness detection network based on the authenticity prediction result and tagged authenticity information of the sample image.

In the embodiments of the present disclosure, the liveness detection network is obtained based on training of the initial liveness detection network. In the training process, because the sample image includes two modalities, an authenticity prediction result of the sample image needs to be determined based on the sample modality classification result. After the training is completed, a part (e.g., a modality classifier) for modality classification in the initial liveness detection network is removed, namely, being a liveness detection network for realizing liveness detection in the present disclosure.

Optionally, determining the sample modality classification result of the sample image based on the sample feature information includes:

Determining, based on the sample feature information, a classification probability that the sample image belongs to the first modality and a classification probability that the sample image belongs to the second modality; and determining a sample modality to which the sample image belongs based on the classification probability that the sample image belongs to the first modality and the classification probability that the sample image belongs to the second modality.

Specifically, the classification probability of each modality may be obtained based on the sample feature information, where the classification probability of the modality indicates the probability that the sample image belongs to the modality. For example, the at least one modality may refer to two modalities, namely, a first modality and a second modality, and two classification probabilities are obtained based on the sample feature information, where the classification probability of the first modality is 0.9, and the classification probability of the second modality is 0.5. In this case, the modality to which the sample image belongs may be determined based on the classification probability of the first modality and the classification probability of the second modality. In one example, a threshold is preset, and the modality corresponding to the classification probability reaching the threshold is determined as the modality to which the sample image belongs, for example, the threshold is set as 0.8. In this case, the classification probability of the first modality, i.e., 0.9, is greater than the threshold, and the classification probability of the second modality is less than the threshold. Therefore, the first modality is taken as the modality to which the sample image belongs, i.e., the target modality. In another example, the modality corresponding to the maximum value in the two classification probabilities may be determined as the modality to which the sample image belongs. The embodiments of the present disclosure do not limit specific implementations for determining the target modality based on each of the at least one classification probability.

In some other optional embodiments, the two classification probabilities may be directly taken as the sample modality classification result, namely, the sample modality classification result includes the classification probability corresponding to each of the at least one modality. In this case, optionally, an authenticity prediction result of a target object in the sample image may be determined based on the classification probability corresponding to each modality in the sample modality classification result. For example, the classification probability corresponding to each modality is taken as a weight of the each modality to obtain the authenticity prediction result. However, no limitation is made thereto in the embodiments of the present disclosure.

Optionally, in the embodiments of the present disclosure, the sample image may be classified through a modality classifier based on the sample feature information so as to obtain an accurate modality classification result, the modality classifier may be a classification network, and the classification network may take the sample feature information as an input, and output the classification probability of each of the at least one modality or the sample modality classification result of the sample image. No limitation is made thereto in the embodiments of the present disclosure.

Optionally, an authenticity prediction result of the sample image is determined based on the sample modality classification result, including:

determining the authenticity prediction result of the sample image based on the sample modality classification result and the sample feature information.

The embodiments of the present disclosure point out that whether a target object in the sample image is living is determined based on the sample modality classification result and the sample feature information. The sample modality classification result is a result obtained based on the sample feature information that a current sample image belongs to which modality, and the sample feature information represents a feature of the sample image. The authenticity prediction result obtained based on the sample feature information and the sample modality classification result is more accurate.

Optionally, an authenticity prediction result of the sample image is determined based on the sample modality classification result and the sample feature information, including:

merging the sample feature information with the sample modality classification result of the sample image to obtain a sample merging result; and determining the authenticity prediction result of the sample image based on the sample merging result.

Optionally, the merging may be fusing or concatenating of the sample modality classification result and the sample feature information, for example, the sample modality classification result and the sample feature information are superimposed along dimension, or the sample feature information and the sample modality classification result may be added in an element-by-element manner, or are merged in other manners. No limitation is made thereto in the embodiments of the present disclosure.

Optionally, the sample merging result may be input into an authenticity classifier, where, optionally, the authenticity classifier obtains a classification probability vector based on the sample merging result, and the classification probability vector includes two values, one of which indicates the probability that the target is living, and the other indicates the probability that the target is not living. The authenticity prediction result is determined according to the two values. In one example, the authenticity prediction result is determined by comparing the two values, for example, if the probability of being living is greater than the probability of being not living, it can be predicted that the target object is living, and if the probability of being not living is greater than the probability of being living, it can be predicted that the target object is not living. In another example, whether the target object is living is determined by comparing the probability and a preset threshold, for example, if the probability of being living is greater than the preset threshold, the target object is predicted as living. No limitation is made thereto in the embodiments of the present disclosure.

In one optional example of the embodiments of the present disclosure, because the acquisition method for first modality data is single, the obtained face data cannot meet requirements of a deep learning algorithm in quantity and diversity. Merely using the first modality data for algorithm learning may easily result in overfitting. However, the second modality data may be obtained in various ways, for example, collected by itself, obtained from an academic standard data set, or fetched from a network and the like. The quantity and diversity of the finally obtained data are far higher than those of the first modality data.

In specific application, the cross-modality method in the present disclosure may be applied to a face unlocking product of a mobile phone including a near-infrared monocular camera. The cross-modality face anti-spoofing method in the present disclosure may also be applied to a customized device including a near-infrared camera to be used for face anti-spoofing.

A person of ordinary skill in the art may understand that: all or some operations for implementing the foregoing method embodiments are achieved by related hardware instructed by a program; the foregoing program may be stored in a computer readable storage medium; and when the program is executed, the operations including the foregoing method embodiments are executed. Moreover, the foregoing storage medium includes various media capable of storing program codes, such as a ROM, a RAM, a magnetic disk, or an optical disk.

Figure 6:
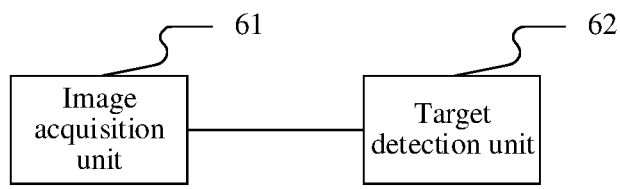
FIG. 6 is a schematic structural diagram of another apparatus for liveness detection according to the embodiments of the present disclosure.

FIG. 6 is a schematic structural diagram of another apparatus for liveness detection according to the embodiments of the present disclosure. In some embodiments, the apparatus is configured to implement the foregoing method embodiments of the present disclosure. However, the embodiments of the present disclosure are not limited thereto. As shown in FIG. 6, the apparatus includes:

an image acquisition unit 61, configured to obtain an image of a first modality; and a target detection unit 62, configured to carry out liveness detection on the image by means of a liveness detection network to determine whether a target object in the image is living, where the liveness detection network is obtained by training an initial liveness detection network based on a sample image set, and the sample image set includes a sample image of the first modality and a sample image of a second modality.

In some optional embodiments, the image collected by a novel monocular camera belongs to a first modality. For example, the image collected by a near-infrared camera belongs to a first modality, and a second modality is an RGB modality, namely, the image collected by an RGB camera belongs to the second modality. In the training process, the image collected by an infrared camera serves as first modality data, and RGB data serves as second modality data. Although the first modality data and the second modality data have a large visual difference, clues of some fake persons included therein have similarity. For example, the paper photo exposes an obvious edge in the image, and the screen photo has a highlight in a local area due to light reflection. Similar clues among different modalities may be learned through a parameter-sharing deep learning network and learning tasks of different modality data. Here, the first modality data provides special fake clues in the first modality, and the second modality data provides various general fake clues. The combined action of different modality data may enable a final deep learning network to learn special fake information of the first modality, and see various general fake clues, so that the phenomenon that the generalization ability of an algorithm is weakened due to overfitting is avoided.

In the embodiments of the present disclosure, the liveness detection network is trained by combining the image of the second modality, so that the phenomenon of overfitting in the training process caused by few images of the first modality is avoided, and the trained liveness detection network may more accurately determine whether a target object in the image of the first modality is living.

Optionally, the target detection unit 62 is configured to carry out feature extraction on the image by means of a liveness detection network to obtain image feature information, and determine whether the target object in the image is living by means of the liveness detection network based on the image feature information.

In some optional embodiments, the apparatus in the embodiments of the present disclosure further includes:

a detection network training unit, configured to carry out feature extraction on a sample image in the sample image set to obtain sample feature information; determine a sample modality classification result of the sample image based on the sample feature information, the sample modality classification result indicating that the sample image corresponds to a sample modality in at least one modality; determine an authenticity prediction result of the sample image based on the sample modality classification result; and adjust network parameters of the initial liveness detection network based on the authenticity prediction result and tagged authenticity information of the sample image.

In the embodiments of the present disclosure, the liveness detection network is obtained based on training of the initial liveness detection network. In the training process, because the sample image includes two modalities, an authenticity prediction result of the sample image needs to be determined based on the sample modality classification result. After the training is completed, a part (e.g., a modality classifier) for modality classification in the initial liveness detection network is removed, namely, being a liveness detection network for realizing liveness detection in the present disclosure.

Optionally, the detection network training unit is configured to, when determining a sample modality classification result of the sample image based on the sample feature information, carry out classification processing based on the sample feature information to obtain a classification probability that the sample image belongs to the first modality and a classification probability that the sample image belongs to the second modality; and determining a sample modality classification result of the sample image based on the classification probability belonging to the first modality and the classification probability belonging to the second modality.

Optionally, the detection network training unit is configured to, when determining an authenticity prediction result of the sample image based on the sample modality classification result, determine the authenticity prediction result of the sample image based on the sample modality classification result and the sample feature information.

Optionally, the detection network training unit is configured to, when determining the authenticity prediction result of the sample image based on the sample modality classification result and the sample feature information, merge the sample feature information with the sample modality classification result of the sample image to obtain a sample merging result, and determine the authenticity prediction result of the sample image based on the sample merging result.

In some optional embodiments, the first modality is a near-infrared modality, and the second modality is an RGB modality.

An electronic device provided according to another aspect of the embodiments of the present disclosure includes a processor, where the processor includes the apparatus for liveness detection according to any one of the foregoing embodiments.

An electronic device provided according to another aspect of the embodiments of the present disclosure includes: a memory, configured to store executable instructions; and a processor, configured to communicate with the memory to execute the executable instructions so as to perform operations of the method for liveness detection according to any one of the foregoing embodiments.

A computer readable storage medium provided according to another aspect of the embodiments of the present disclosure is configured to store computer readable instructions, where when the instructions are executed, the operations of the method for liveness detection according to any one of the foregoing embodiments are executed.

A computer program product provided according to another aspect of the embodiments of the present disclosure includes computer readable codes, where when the computer readable codes run in a device, the processor in the device executes the instructions for implementing the method for liveness detection according to any one of the foregoing embodiments.

Another computer program product provided according to yet another aspect of the embodiments of the present disclosure is configured to store computer readable instructions, where when the instructions are executed, a computer executes the operations of the method for liveness detection in any one of the foregoing possible implementations.

In one or more optional implementations, the embodiments of the present disclosure also provide a computer program product configured to store computer readable instructions, where when the instructions are executed, a computer executes the operations of the method for liveness detection in any one of the foregoing possible implementations The computer program product is specifically implemented by means of hardware, software, or a combination thereof. In one optional example, the computer program product is specifically represented by a computer storage medium. In another optional example, the computer program product is represented by a software product, such as Software Development Kit (SDK).

According to the embodiments of the present disclosure, further provided are methods and apparatuses for liveness detection, electronic devices, computer storage media, and computer program products, including: carrying out feature extraction on a collected image to obtain image feature information; determining a modality classification result of the image based on the image feature information, the modality classification result indicating that the image corresponds to a target modality in at least one modality; and determining whether a target object in the image is living based on the modality classification result of the image.

In some embodiments, the image processing instruction is specifically an invoking instruction. The first apparatus instructs, by means of invoking, the second apparatus to execute image processing. Accordingly, in response to receiving the invoking instruction, the second apparatus executes the operations and/process in any one of the embodiments of the image processing method.

It should be understood that the terms such as "first" and "second" in the embodiments of the present disclosure are only used for distinguishing, and shall not be understood as limitations on the embodiments of the present disclosure. It should also be understood that, in the present disclosure, "multiple" may refer to two or more, and "at least one" may refer to one, two or more. It should be further understood that any component, data, or structure mentioned in the present disclosure should be generally understood as one or more under the condition that no explicit definition is provided or no opposite motivation is provided in the context. It should also be understood that, the descriptions of the embodiments in the present disclosure focus on differences between the embodiments, and for same or similar parts in the embodiments, refer to these embodiments. For the purpose of brevity, details are not described again.

Figure 7:
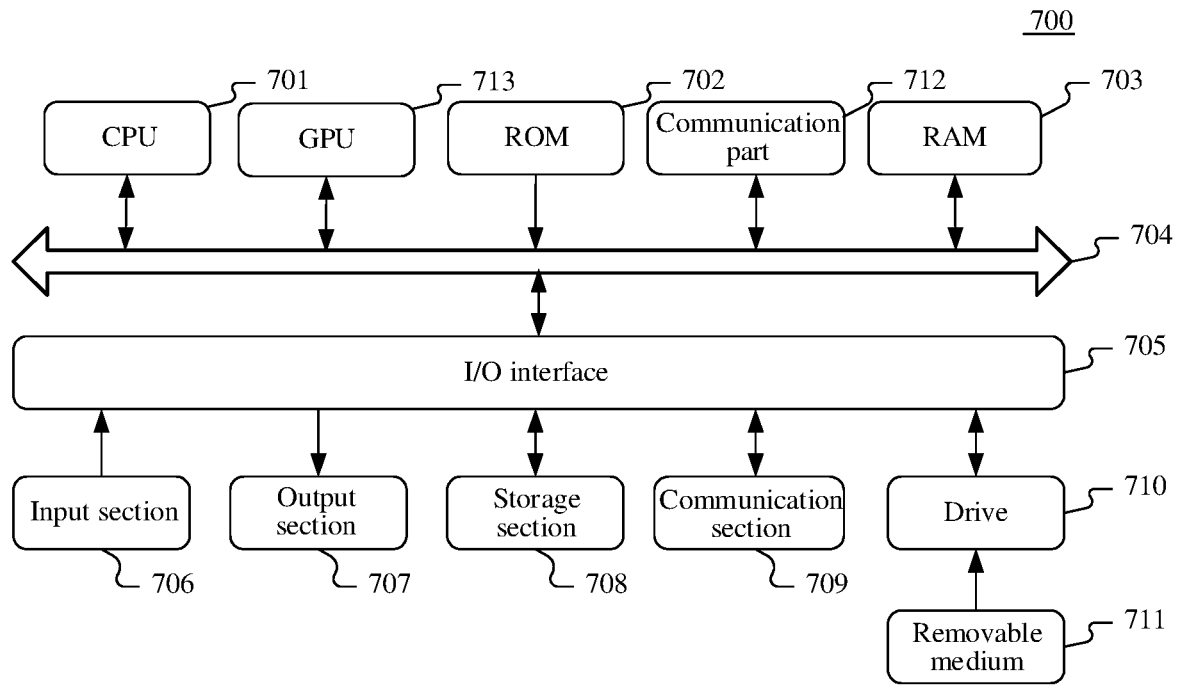
FIG. 7 is a schematic structural diagram of an example of an electronic device for implementing the technical solutions of the embodiments of the present disclosure.

The embodiments of the present disclosure further provide an electronic device which, for example, is a mobile terminal, a Personal Computer (PC), a tablet computer, a server, and the like. FIG. 7 is a schematic structural diagram of an example of an electronic device for implementing the technical solutions of the embodiments of the present disclosure. As shown in FIG. 7, the electronic device 700 includes one or more processors, a communication section, and the like. The one or more processors are, for example, one or more Central Processing Units (CPUs) 701 and/or one or more Graphic Processing Units (GPUs) 713, and the processors execute various appropriate actions and processing according to executable instructions stored in a Read-Only Memory (ROM) 702 or executable instructions loaded from a storage section 708 to a Random Access Memory (RAM) 703. The communication section 712 may include, but is be limited to, a network card. The network card may include, but is not limited to, an Infiniband (IB) network card.

The processor may communicate with the ROM 702 and/or the RAM 703 to execute the executable instructions, and is connected to the communication section 712 by means of a bus 704 and communicates with other target devices by means of the communication section 712, so as to perform the operations corresponding to any one of the methods provided in the embodiments of the present disclosure. For example, feature extraction is carried out on a collected image to obtain image feature information; a modality classification result of the image is determined based on the image feature information, the modality classification result indicating that the image corresponds to a target modality in at least one modality; and whether a target object in the image is living is determined based on the modality classification result of the image.

In addition, the RAM 703 may further store various programs and data required for operations of the apparatus. The CPU 701, the ROM 702, and the RAM 703 are connected to each other via the bus 704. In the presence of the RAM 703, the ROM 702 is an optional module. The RAM 703 stores executable instructions, or writes the executable instructions into the ROM 702 during running, where the executable instructions cause the CPU 701 to execute corresponding operations of the foregoing communication method. An input/output (I/O) interface 705 is also connected to the bus 704. The communication section 712 may be integrated, or may be configured to have multiple sub-modules (such as, multiple IB network cards) connected to the bus.

The following components are connected to the I/O interface 705: an input section 706 including a keyboard, a mouse and the like; an output section 707 including a Cathode-Ray Tube (CRT), a Liquid Crystal Display (LCD), a speaker and the like; the storage section 708 including a hard disk drive and the like; and a communication section 709 of a network interface card including an LAN card, a modem and the like. The communication section 709 performs communication processing via a network such as the Internet. A drive 710 is also connected to the I/O interface 705 according to requirements. A removable medium 711 such as a magnetic disk, an optical disk, a magneto-optical disk, a semiconductor memory or the like is mounted on the drive 710 according to requirements, so that a computer program read from the removable medium is installed on the storage section 708 according to requirements.

It should be noted that the architecture illustrated in FIG. 7 is merely one optional implementation. During specific practice, the number and types of the components in FIG. 7 are selected, decreased, increased, or replaced according to actual requirements. Different functional components may be separated or integrated or the like. For example, the GPU 713 and the CPU 701 may be separated, or the GPU 713 may be integrated on the CPU 701, and the communication section may be separated from or integrated on the CPU 701 or the GPU 713 or the like. These alternative implementations fall within the scope of protection of the present disclosure.

Particularly, a process described above with reference to a flowchart according to the embodiments of the present disclosure may be implemented as a computer software program. For example, the embodiments of the present disclosure include a computer program product, which includes a computer program tangibly included in a machine readable medium. The computer program includes a program code for executing a method illustrated in the flowchart. The program code may include corresponding instructions for correspondingly executing the operations of the method provided according to the embodiments of the present disclosure. For example, feature extraction is carried out on a collected image to obtain image feature information; a modality classification result of the image is determined based on the image feature information, the modality classification result indicating that the image corresponds to a target modality in at least one modality; and whether a target object in the image is living is determined based on the modality classification result of the image. In such embodiments, the computer program is downloaded and installed from the network through the communication section 709, and/or is installed from the removable medium 711. The computer program, when being executed by the CPU 701, executes the operations of the foregoing functions defined in the methods of the present disclosure.

The methods and the apparatuses of the present disclosure may be implemented in many manners. For example, the methods and apparatuses of the present disclosure may be implemented by using software, hardware, firmware, or any combination of software, hardware, and firmware. Unless otherwise specially stated, the foregoing sequences of operations of the methods are merely for description, and are not intended to limit the operations of the methods of the present disclosure. In addition, in some embodiments, the present disclosure may be implemented as programs recorded in a recording medium. The programs include machine readable instructions for implementing the methods according to the present disclosure. Therefore, the present disclosure further covers the recording medium storing the programs for executing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

What is claimed is:

1. A method for liveness detection, comprising:
   performing feature extraction on an image to obtain image feature information;
   determining a modality classification result of the image based on the image feature information, wherein the modality classification result indicates that the image corresponds to a target modality in at least one modality; and
   determining whether a target object in the image is living based on the modality classification result of the image,
   wherein determining the modality classification result of the image based on the image feature information comprises:

performing classification processing based on the image feature information to obtain a classification probability that the image belongs to each of the at least one modality; and determining the target modality to which the image belongs based on the classification probability that the image belongs to each of the at least one modality.

2. The method according to claim 1, wherein determining whether the target object in the image is living based on the modality classification result of the image comprises:

determining whether the target object in the image is living based on the modality classification result of the image and the image feature information.

3. The method according to claim 2, wherein determining whether the target object in the image is living based on the modality classification result of the image and the image feature information comprises:

merging the image feature information with the modality classification result of the image to obtain a merging result; and determining whether the target object in the image is living based on the merging result.

4. The method according to claim 2, wherein determining whether the target object in the image is living based on the modality classification result of the image and the image feature information comprises:

obtaining an authenticity prediction probability corresponding to each of the at least one modality based on the image feature information; and determining whether the target object in the image is living based on the modality classification result and the authenticity prediction probability corresponding to each of the at least one modality.

5. The method according to claim 4, wherein the modality classification result comprises the classification probability that the image belongs to each of the at least one modality; and determining whether the target object in the image is living based on the modality classification result and the authenticity prediction probability corresponding to each of the at least one modality comprises:

performing weighted sum on the authenticity prediction probabilities of all the at least one modality by taking the classification probability that the image belongs to each modality as a weight value corresponding to the each modality, so as to obtain a target authenticity prediction probability; and determining whether the target object in the image is living based on the target authenticity prediction probability.

6. The method according to claim 4, wherein determining whether the target object in the image is living based on the modality classification result and the authenticity prediction probability corresponding to each of the at least one modality comprises:

determining a target authenticity prediction probability from the at least one authenticity prediction probability based on the classification probability corresponding to each of the at least one modality comprised in the modality classification result; and determining whether the target object in the image is living based on the target authenticity prediction probability.

7. The method according to claim 6, wherein determining the target authenticity prediction probability from the at least one authenticity prediction probability based on the classification probability corresponding to each of the at least one modality comprised in the modality classification result comprises:

in response to presence of a classification probability greater than or equal to a predetermined probability in the at least one classification probability comprised in the modality classification result, determining a modality corresponding to the classification probability greater than or equal to the predetermined probability as the target modality, and determining an authenticity prediction probability of the target modality as the target authenticity prediction probability.

8. The method according to claim 1, before performing feature extraction on the image to obtain the image feature information, further comprising:

performing image acquisition by means of a dual-channel camera to obtain the image.

9. The method according to claim 8, wherein the at least one modality comprises: a dual-channel modality and a red-green-blue (RGB) modality.

10. The method according to claim 1, wherein the method is implemented by using a liveness detection network, and before performing feature extraction on the image to obtain the image feature information, the method further comprises:

training an initial liveness detection network based on a sample data set to obtain the liveness detection network, wherein the sample data set comprises sample images of at least two modalities.

11. An electronic device, comprising:

a memory, configured to store executable instructions; and a processor, configured to communicate with the memory to execute the executable instructions stored in the memory, when the executable instructions are executed, the processor is configured to:

perform feature extraction on an image to obtain image feature information;

determine a modality classification result of the image based on the image feature information, wherein the modality classification result indicates that the image corresponds to a target modality in at least one modality; and determine whether a target object in the image is living based on the modality classification result of the image, wherein the processor is further configured to:

perform classification processing based on the image feature information to obtain a classification probability that the image belongs to each of the at least one modality; and determine the target modality to which the image belongs based on the classification probability that the image belongs to each of the at least one modality.

12. A non-transitory computer readable storage medium for storing computer readable instructions, wherein when the computer readable instructions are executed, a processor is configured to perform the following operations:

perform feature extraction on an image to obtain image feature information;

determine a modality classification result of the image based on the image feature information, wherein the modality classification result indicates that the image corresponds to a target modality in at least one modality; and determine whether a target object in the image is living based on the modality classification result of the image, wherein determining the modality classification result of the image based on the image feature information comprises:

performing classification processing based on the image feature information to obtain a classification probability that the image belongs to each of the at least one modality; and determining the target modality to which the image belongs based on the classification probability that the image belongs to each of the at least one modality.

13. The electronic device of claim 11, wherein the processor is further configured to:

determine whether the target object in the image is living based on the modality classification result of the image and the image feature information.

14. The electronic device of claim 13, wherein the processor is further configured to:

merge the image feature information with the modality classification result of the image to obtain a merging result; and determine whether the target object in the image is living based on the merging result.

15. The electronic device of claim 13, wherein the processor is further configured to:

obtain an authenticity prediction probability corresponding to each of the at least one modality based on the image feature information; and determine whether the target object in the image is living based on the modality classification result and the authenticity prediction probability corresponding to each of the at least one modality.

16. The electronic device of claim 15, wherein the processor is further configured to:

perform weighted sum on the authenticity prediction probabilities of all the at least one modality by taking the classification probability that the image belongs to each modality as a weight value corresponding to the each modality, so as to obtain a target authenticity prediction probability; and determine whether the target object in the image is living based on the target authenticity prediction probability.

17. The electronic device of claim 15, wherein the processor is further configured to:

determine a target authenticity prediction probability from the at least one authenticity prediction probability based on the classification probability corresponding to each of the at least one modality comprised in the modality classification result; and determine whether the target object in the image is living based on the target authenticity prediction probability.

18. The electronic device of claim 17, wherein the processor is further configured to:

in response to presence of a classification probability greater than or equal to a predetermined probability in the at least one classification probability comprised in the modality classification result, determine a modality corresponding to the classification probability greater than or equal to the predetermined probability as the target modality, and determine an authenticity prediction probability of the target modality as the target authenticity prediction probability.

* * * * *